Figure 1:
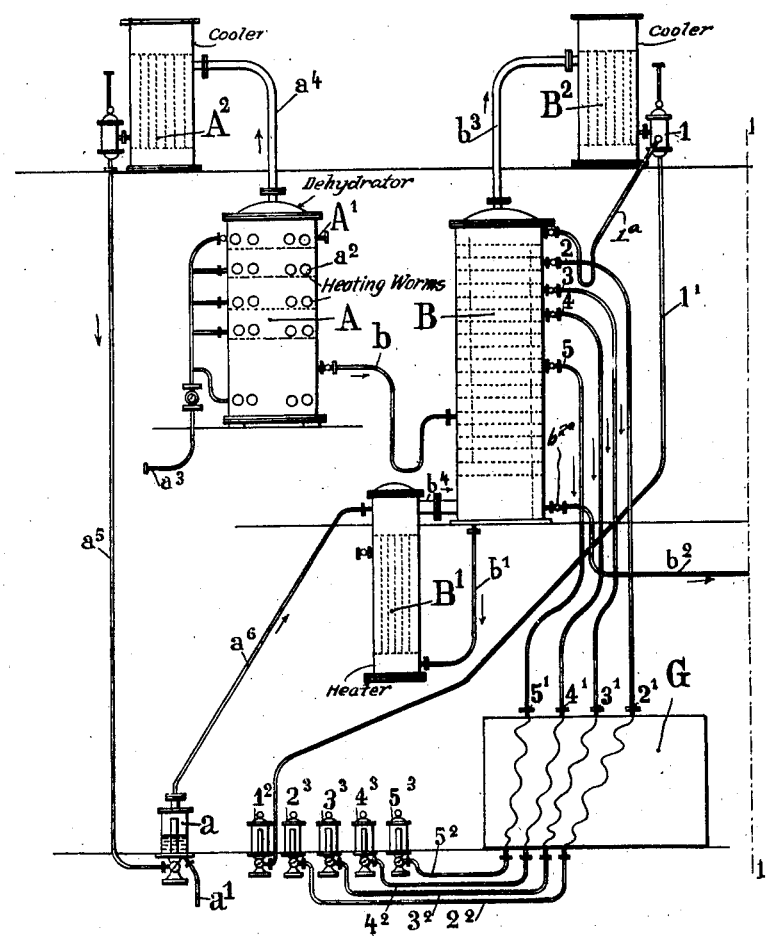

Oct. 27, 1925.

E. A. BARBET 1,559,218

PROCESS OF CONTINUOUS RECTIFICATION OF SPIRITS, PETROLEUMS, AND BENZOLS

Filed June 25, 1918  2 Sheets-Sheet 1

Inventor.
E. A. Barbet.
By H. R. Kerslake
Atty.

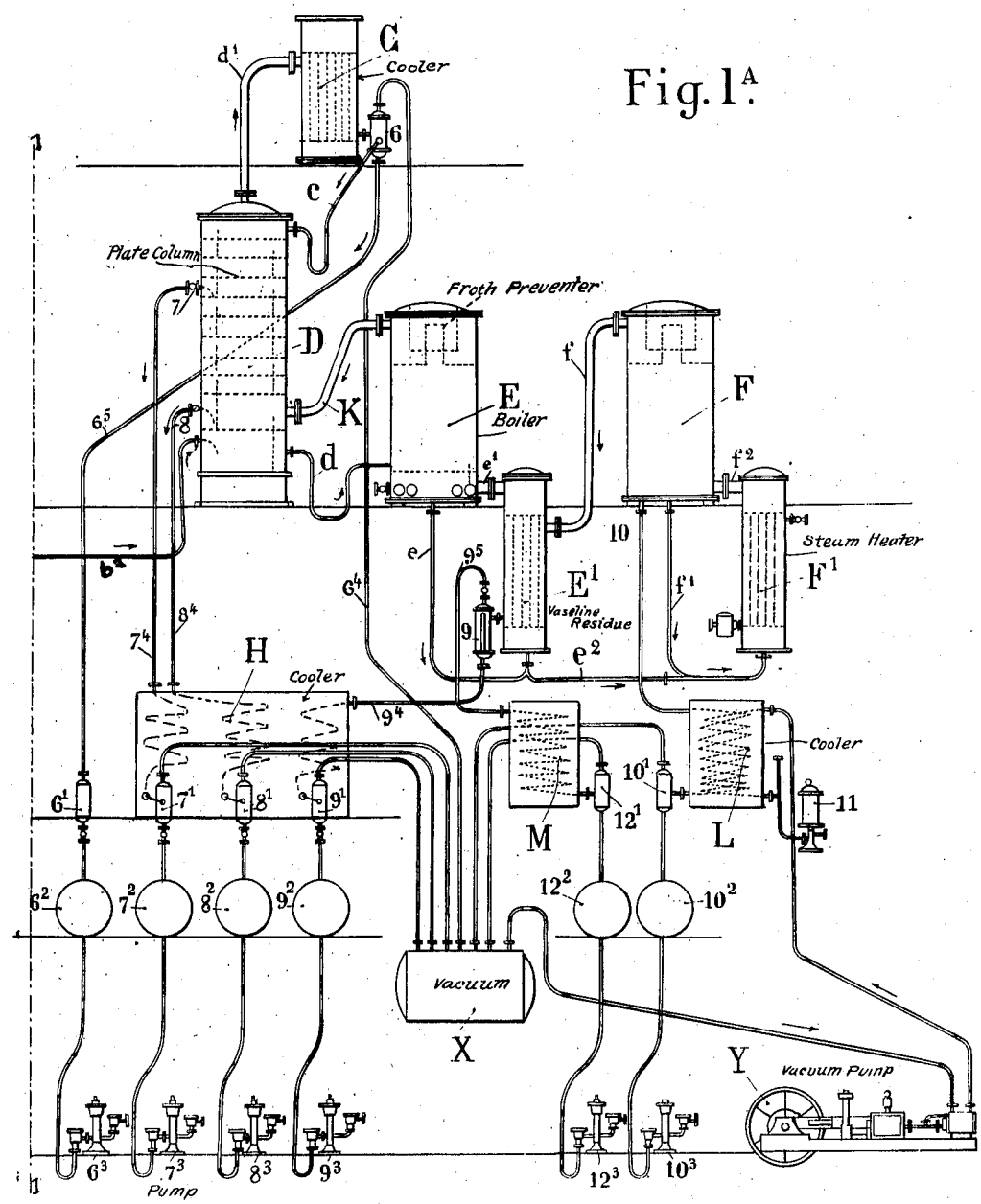

Patented Oct. 27, 1925.

1,559,218

UNITED STATES PATENT OFFICE.

EMILE AUGUSTIN BARBET, OF PARIS, FRANCE.

PROCESS OF CONTINUOUS RECTIFICATION OF SPIRITS, PETROLEUMS, AND BENZOLS.

Application filed June 25, 1918. Serial No. 241,841.

*To all whom it may concern:*

Be it known that I, EMILE AUGUSTIN BARBET, citizen of the French Republic, residing at 5 Rue de l'Echelle, Paris, France, have invented a certain new and useful Process of Continuous Rectification of Spirits, Petroleums, and Benzols, of which the following is a specification.

This invention relates to the process and apparatus for the continuous fractional distillation of mixtures of liquids having different boiling points, and constitutes an improvement on the showing of my British Patent No. 9088 of 1914, (and my corresponding U. S. patent application 830,178 filed April 7, 1914, now Patent 1,319,319, October 21, 1919).

The apparatus claimed in the specification of the aforesaid patent is of the type in which the liquid to be distilled is continuously passed through a series of bulk evaporators of successively increasing temperatures and operating at the same pressure, the heat contained in the vapors produced being employed for evaporating constituents having lower boiling points and is characterized in this, that the vapors produced in each evaporator operating at a higher temperature are employed for vaporizing the lower boiling portions of the liquid contained in the evaporator operating at the next lower temperature, the vapor produced in one stage of the distillation flowing in heat-conducting relation with the contents of the vessel in which the next stage of the distillation is carried out, in the reverse direction to the flow of the liquid in said vessel.

It is proposed in the said specification in treating crude petroleum to effect the distillation of certain fractions under normal atmospheric pressure and to distil the higher boiling portions under reduced pressure.

The employment of superposed boilers is proposed in the said prior specification and it is indicated therein that for works of exceptional capacity independent evaporating chests may be employed.

The present invention which is an improvement or modification of the invention claimed in the aforesaid specification consists in carrying out the first fractionation operation as a single effect at atmospheric pressure in a plate column in which the separation of the several fractions is effected, carrying out the rectification and classification of the "white spirits," and various relatively high boiling petroleum products by means of a multiple heating effect in a vacuum, the petroleum being subjected to a preceding effect operating by simple expansion due to the introduction of the heated petroleum from a previous treatment at atmospheric pressure to remove the lower boiling constituents into a chamber in which a vacuum is maintained.

The invention also includes treating the vapor produced in the first of the said multiple heating effects together with the vapor produced in the effect operating by simple expansion, in a plate column provided with the necessary drawing-off devices.

Prior to treatment to effect the removal by distillation under atmospheric pressure of the lower boiling products the mixture of liquids as, for instance, petroleum is subjected to a continuous dehydration.

In the accompanying diagrammatic drawing an apparatus within the scope of the aforesaid specification and as improved or modified in accordance with the present invention, designed more particularly for the final rectification of kerosene in a vacuum, is illustrated by way of example. It is, however, to be understood that this apparatus is also adapted for use in the rectification of other volatile substances, for instance benzols.

For the removal of the gasoline a single effect column is shown, because the consumption of steam required to vaporize the 20 to 25% of gasoline (based on the weight of the petroleum) is so small that there does not seem to be any advantage in complicating the apparatus and converting it into a double or triple-effect apparatus. In very large plants, double or triple-effect apparatus could be used to advantage.

The improved apparatus illustrated comprises a preliminary dehydrator for the crude petroleum. Certain oils contain 2% and even as much as 3% of water; this quantity is sufficient to cause an inconvenient disturbance in the fractionation.

Referring to the accompanying drawing in which Fig. 1 is a diagrammatic view of the left hand part of my apparatus, and Fig 1ª a similar view of the right hand part of the apparatus:—A is the dehydrating column, composed of superposed plates heated by worms $a^2$ which receive through a pipe $a^3$, exhaust steam from a vacuum engine Y hereinafter referred to. The connection between the pipe $a^3$ and the engine Y is not shown. It is advisable to compress this steam to a pressure of about 1 kilog., in order that the petroleum may reach the temperature proper for dehydration. The petroleum enters the column through the pipe $A^1$. The mixture of water vapor and gasoline vapor passes through the pipe $a^4$ to the cooler $A^2$ wherein it is condensed and whence it descends through the pipe $a^5$ into the closed separating device $a$ in which the gasoline and water separate, the gasoline passing through the pipe $a^6$ into the gasoline-removing apparatus and the water being drawn off through the bottom $a'$ and discharged to waste.

The dehydrated crude petroleum is led by the trap pipe $b$ to the plate column B wherein the gasolines are driven off, it descends from plate to plate until it reaches, through the pipe $b^1$, the (tubular or worm) heater $B^1$. In order to efficiently remove the gasoline from the crude petroleum, the steam heating this heater must be at 190 or 200° C., that is to say, of a net pressure of about 15 kilos above atmospheric. The petroleum residue passes from B to B' by way of the pipe $b'$ and the vapors arising from the residue which is heated during its passage through B' pass back by way of $b^4$ to B.

The vapors of the light fractions rise in the rectifying column (past the successive plates) and pass therefrom by way of the pipe $b^3$ into the cooler condenser $B^2$, the condensate (gasoline) from which enters the separator 1, a desired portion of the condensate being returned to the top plates of the column by way of the pipe $1^a$, while the remainder of the gasoline passes directly by way of the pipe $1'$ to the testing device $1^z$.

This testing device and similar devices which are provided at a number of other points and are referred to herein as testing devices, are of known character and they are provided to enable the density of the liquid passing through them to be determined.

The proportion of the condensate from $B^2$ entering the column may be varied by appropriate adjustment of a valve associated with the outlet from the testing device $1^z$ adapted to control the rate at which liquid is withdrawn through the latter.

For the purpose of facilitating reference to the drawing, the same reference number with the addition of indices has been given to the various devices through which the fractionated products pass from their exit from the fractionating apparatus to their final exit.

Gasoline of a specific gravity of about 0.68 is drawn off at 2; it passes through the pipe $2^1$ to the cooler G wherein it is cooled and whence it passes through pipe $2^2$ to the testing device $2^3$.

At 3, gasoline of a specific gravity of about 0.70 is drawn off; it passes through the pipe $3^1$ into the cooler G wherein it is cooled and whence it passes through the pipe $3^2$ to be measured at the testing device $3^3$.

At 4 and 5 similar drawings-off are effected for products with specific gravities of 0.72 and 0.74 which respectively pass off, are cooled and are measured by devices $4^1$—G—$4^2$—$4^3$ and $5^1$—G—$5^2$ and $5^3$.

After these products have been removed by distilling at atmospheric pressure, the distillation in a vacuum must be effected and this operation is divided into three effects.

The crude petroleum deprived of its gasoline, etc., being above 175° centigrade, is sucked by the vacuum maintained in the remainder of the apparatus, into the bottom of the plate column D through the pipe $b^2$ in which is provided a valve $b^{2a}$ acting as a throttle or choke preventing the free flow of liquid from the base of B to the base of D and thus preventing a vacuum being produced in B. As it is superheated relatively to the existing vacuum, a certain portion of the petroleum is spontaneously converted into vapors that rise in the plates of D, pass through the pipe $d^1$ into the cooler-condenser C and are fractionated by means of the "reflux" of the cooler-condenser C, which flows back by $c$.

From the exit flask 6 the non-condensed portions pass out through the upper pipe $6^4$ on their way to the vacuum vessel X. A portion of the liquid descends through the pipe $6^5$ to the special testing device $6^1$, and into the vat $6^2$; and is pumped off by the pump $6^3$.

Another portion of the liquid passes out through the pipe $c$ back over the plates of the column D.

The vapors of the second effect E $E^1$ (hereinafter referred to) enter the column D through the pipe K. These vapors mix with the vapors of the spontaneous vaporization and are rectified together in the column D. A very fine product is drawn off at 7, and a fine product at 8. These liquids pass respectively through pipes $7^4$ and $8^4$ into the cooler H wherein they are cooled, and whence they pass respectively to the testing devices $7^1$ and $8^1$, to the reservoirs $7^2$ and $8^2$ and to the pumps $7^3$ and $8^3$.

The crude petroleum passes from the bottom of D through a bent pipe $d$ into the second effect E. This second effect consists for instance of a very large boiler E with a froth-preventer at the top, heated by a circulation of oil between itself and the tubular vessel $E^1$ to which it is connected by pipes $e$ and $e^1$, the circulation of the liquid being produced by a thermo-siphon. After the evaporation in E E¹ (2nd vaporizing effect) which yields the fine product drawn off at 8, the residue passes through the pipe $e^2$ into the first effect F F¹. This latter effect is constructed in the same manner as the effect E, E¹. The circulation between F and F¹ is produced by a thermo-siphon by way of the pipes $f^1$ and $f^2$.

F¹ is heated by steam from a steam generator working at a pressure of about 15 kg. This effect yields a very common product mixed with solar oil.

The vaselinous residue deprived of its lighting oil in F F¹, issues at 10, is cooled in the cooler L, issues through the testing device 10¹, passes into the reservoir 10², and thence to the pump 10³.

The vapor of low quality petroleum produced in F F¹, serves to produce ebullition in the second effect E E¹; it passes through the pipe $f$ into the heater E¹ wherein it is condensed and produces the second vaporizing effect. The condensed liquid issues through the separating flask 9, passes through a pipe 9⁴, for cooling in a worm of H, and then passes to the testing device 9¹, the vat 9² and the pump 9³.

The small quantity of non-condensed vapor and the incondensable gases issuing from 9, pass through 9⁵ into a small cooler M, and thence through the testing device 12¹ to a vat 12² and a pump 12³.

All the receivers are placed in communication with the vacuum vessel X connected to the vacuum pump Y. The highly expanded cold vapors drawn by the engine Y are compressed to atmospheric pressure. They become hot again by the compression. They are sent into a second coil contained in L, wherein they are liquefied, and passing out through the testing device 11, give a product which can be mixed with the common product.

It will thus be perceived that the second part of the operation is effected with triple effect in a vacuum.

I claim:

1. The continuous process for the distillation of a mixture of volatile liquids having different boiling points, which comprises supplying heat to the mixture to vaporize the lower boiling constituents thereof at atmospheric pressure, condensing the vapours thereby formed, interrupting the supply of heat to the residual liquid and subjecting it while in a heated state to a pressure below that of the atmosphere, subjecting the vapours thereby formed to fractionation and subjecting the liquid residue from this operation to multiple effect evaporation in vacuo with the application of heat.

2. The continuous process for the distillation of a mixture of volatile liquids having different boiling points, which comprises supplying heat to the mixture to vaporize the lower boiling constituents thereof at atmospheric pressure, condensing the vapours thereby formed, interrupting the supply of heat to the residual liquid and subjecting it while in a heated state to a pressure below that of the atmosphere, subjecting the liquid residue from this operation to multiple effect evaporation in vacuo with the application of heat, bringing the vapours of the more volatile products arising in this stage together with the vapours formed by subjecting to a pressure below atmospheric pressure the liquid residue of the first distillation stage and subjecting the resultant mixture of vapours to fractionation.

3. The continuous process for the distillation of a mixture of volatile liquids having different boiling points, which comprises supplying heat to the mixture to vaporize the lower boiling constituents thereof at atmospheric pressure, condensing the vapours thereby formed, interrupting the supply of heat to the residual liquid and subjecting it while in a heated state to a pressure below that of the atmosphere, subjecting the liquid residue from this operation to multiple effect evaporation in vacuo with the application of heat from an external source to the material undergoing distillation in the first effect and the use of the vapours arising in that effect for heating the liquid undergoing distillation in the second effect, bringing the vapours of the more volatile products arising in this stage together with the vapours formed by subjecting to a pressure below atmospheric pressure the liquid residue of the first distillation stage and subjecting the resultant mixture of vapours to fractionation.

4. The continuous process for the distillation of a mixture of volatile liquids having different boiling points, which comprises subjecting the mixture to be heated to a continuous dehydration, supplying heat to the mixture to vaporize the lower boiling constituents thereof at atmospheric pressure, condensing the vapours thereby formed, interrupting the supply of heat to the residual liquid and subjecting it while in a heated state to a pressure below that of the atmosphere, subjecting the vapours thereby formed to fractionation and subjecting the liquid residue from this operation to multiple effect evaporation in vacuo with the application of heat.

5. The continuous process for the distillation of a mixture of volatile liquids having different boiling points, which comprises subjecting the mixture to be heated to a continuous dehydration, supplying heat to the mixture to vaporize the lower boiling constituents thereof at atmospheric pressure, condensing the vapours thereby formed, interrupting the supply of heat to the residual liquid and subjecting it while in a heated state to a pressure below that of the atmosphere, subjecting the liquid residue from this residue to multiple effect evaporation in vacuo with the application of heat, bringing the vapours of the more volatile products arising in this stage together with the vapours formed by subjecting to a pressure below atmospheric pressure the liquid residue of the first distillation stage and subjecting the resultant mixture of vapours to fractionation.

6. The continuous process for the distillation of a mixture of volatile liquids having different boiling points, which comprises subjecting the mixture to be heated to a continuous dehydration, supplying heat to the mixture to vaporize the lower boiling constituents thereof at atmospheric pressure, condensing the vapours thereby formed, interrupting the supply of heat to the residual liquid and subjecting it while in a heated state to a pressure below that of the atmosphere, subjectig the liquid residue from this operation to multiple effect evaporation in vacuo with the application of heat from an external source to the material undergoing distillation in the first effect and the use of the vapours arising in that effect for heating the liquid undergoing distillation in the second effect, bringing the vapours of the more volatile products arising in this stage together with the vapours formed by subjecting to a pressure below atmospheric pressure the liquid residue of the first distillation stage and subjecting the resultant mixture of vapours to fractionation.

7. The continuous process for the distillation of a mixture of volatile liquids having different boiling points, which comprises supplying heat to the mixture to vaporize the lower boiling constituents thereof at atmospheric pressure, condensing the vapours thereby formed as a plurality of fractions differing in boiling point, interrupting the supply of heat to the residual liquid and subjecting it while in a heated state to a pressure below that of the atmosphere, subjecting the vapours thereby formed to fractionation and subjecting the liquid residue from this operation to multiple effect evaporation in vacuo with the application of heat.

8. The continuous process for the distillation of a mixture of volatile liquids having different boiling points, which comprises supplying heat to the mixture to vaporize the lower boiling constituents thereof at atmospheric pressure, condensing the vapours thereby formed as a plurality of fractions differing in boiling point, interrupting the supply of heat to the residual liquid and subjecting it while in a heated state to a pressure below that of the atmosphere, subjecting the liquid residue from this operation to multiple effect evaporation in vacuo with the application of heat, bringing the vapours of the more volatile products arising in this stage together with the vapours formed by subjecting to a pressure below atmospheric pressure the liquid residue of the first distillation stage and subjecting the resulant mixture of vapours to fractionation.

9. The continuous process for the distillation of a mixture of volatile liquids having different boiling points, which comprises supplying heat to the mixture to vaporize the lower boiling constituents thereof at atmospheric pressure, condensing the vapours thereby formed as a plurality of fractions differing in boiling point, interrupting the supply of heat to the residual liquid and subjecting it while in a heated state to a pressure below that of the atmosphere, subjecting the liquid residue from this operation to multiple effect evaporation in vacuo with the application of heat from an external source to the material undergoing distillation in the first effect and the use of the vapours arising in that effect for heating the liquid undergoing distillation in the second effect, bringing the vapours of the more volatile products arising in this stage together with the vapours formed by subjecting to a pressure below atmospheric pressure the liquid residue of the first distillation stage and subjecting the resultant mixture of vapours to fractionation.

In testimony whereof I have signed my name to this specification.

EMILE AUGUSTIN BARBET.